US011015923B2

(12) United States Patent
Nishi et al.

(10) Patent No.: US 11,015,923 B2
(45) Date of Patent: May 25, 2021

(54) MEASURING DEVICE AND FABRICATING APPARATUS

(71) Applicants: Ryohsuke Nishi, Kanagawa (JP); Yasuaki Yorozu, Kanagawa (JP)

(72) Inventors: Ryohsuke Nishi, Kanagawa (JP); Yasuaki Yorozu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 16/450,102

(22) Filed: Jun. 24, 2019

(65) Prior Publication Data
US 2020/0003553 A1  Jan. 2, 2020

(30) Foreign Application Priority Data

Jun. 29, 2018  (JP) .............................. JP2018-123993

(51) Int. Cl.
*G01B 11/25*  (2006.01)
*G05B 19/4099*  (2006.01)
*B33Y 50/02*  (2015.01)
*B29C 64/393*  (2017.01)

(52) U.S. Cl.
CPC .......... *G01B 11/254* (2013.01); *B29C 64/393* (2017.08); *B33Y 50/02* (2014.12); *G05B 19/4099* (2013.01); *G05B 2219/49023* (2013.01)

(58) Field of Classification Search
CPC ... G01B 11/254; G01B 11/2518; B33Y 50/02; B29C 64/393; G05B 19/4099; G05B 2219/49023; G06T 7/521
See application file for complete search history.

(56) References Cited

U.S. PATENT DOCUMENTS

| 9,233,470 | B1 * | 1/2016 | Bradski | G06T 7/60 |
| 9,804,506 | B2 * | 10/2017 | Arai | G03F 7/70775 |
| 10,183,329 | B2 * | 1/2019 | Gunther | B23K 9/04 |
| 10,406,262 | B2 * | 9/2019 | Bonassar | B33Y 10/00 |
| 2002/0104973 | A1 * | 8/2002 | Kerekes | B33Y 50/02 |
| | | | | 250/559.2 |

(Continued)

FOREIGN PATENT DOCUMENTS

| JP | 2004-020536 | 1/2004 |
| JP | 2012-194061 | 10/2012 |

(Continued)

OTHER PUBLICATIONS

U.S. Appl. No. 16/291,125, filed Mar. 4, 2019, Yasuaki Yorozu.

(Continued)

*Primary Examiner* — Ramesh B Patel

(74) *Attorney, Agent, or Firm* — Harness, Dickey & Pierce, P.L.C.

(57) ABSTRACT

A measuring device includes processing circuitry. The processing circuitry is configured to project a pattern light beam onto a measurement object; acquire, as measurement data, a projection image of the measurement object onto which the pattern light beam is projected; predict, using fabrication data for fabricating the measurement object, a probable image formed by projection of the pattern light beam onto the measurement object to form prediction data; correct the (Continued)

measurement data with the prediction data to form corrected data; and calculate three-dimensional data to the measurement object, using the corrected data.

7 Claims, 7 Drawing Sheets

(56) References Cited

U.S. PATENT DOCUMENTS

| | | | |
|---|---|---|---|
| 2005/0018183 A1* | 1/2005 | Shortt | G01B 11/0633 |
| | | | 356/239.1 |
| 2015/0174828 A1 | 6/2015 | Creuzer et al. | |
| 2015/0198943 A1 | 7/2015 | Kotlus | |
| 2015/0210011 A1* | 7/2015 | Conrow | B29C 64/393 |
| | | | 264/40.4 |
| 2016/0069997 A1* | 3/2016 | Johnson | G01B 11/03 |
| | | | 356/614 |
| 2016/0136896 A1 | 5/2016 | Wighton et al. | |
| 2016/0307322 A1* | 10/2016 | Engel | G01B 11/25 |
| 2017/0050374 A1 | 2/2017 | Minardi et al. | |
| 2017/0056970 A1* | 3/2017 | Chin | B22F 3/1055 |
| 2017/0057170 A1 | 3/2017 | Gupta et al. | |
| 2017/0252820 A1* | 9/2017 | Myerberg | B22F 3/115 |
| 2017/0304947 A1* | 10/2017 | Shibazaki | B23K 26/08 |

FOREIGN PATENT DOCUMENTS

| | | |
|---|---|---|
| JP | 2016-137653 | 8/2016 |
| JP | 2016-137654 | 8/2016 |
| JP | 2018-008403 | 1/2018 |
| WO | WO 2015/081009 A1 | 6/2015 |

OTHER PUBLICATIONS

U.S. Appl. No. 16/352,026, filed Mar. 13, 2019, Wataru Sugawara, et al.
U.S. Appl. No. 16/367,757, filed Mar. 28, 2019, Yasuaki Yorozu.
Graebling, Pierre et al. "Optical high-precision three-dimensional vision-based quality control of manufactured parts by use of synthetic images and knowledge for image-data evaluation and interpretation." *Applied Optics* 1.14 (2002): 2627-2643.
Extended European Search Report dated Nov. 29, 2019 issued in corresponding European Application No. 19182129.7.

* cited by examiner

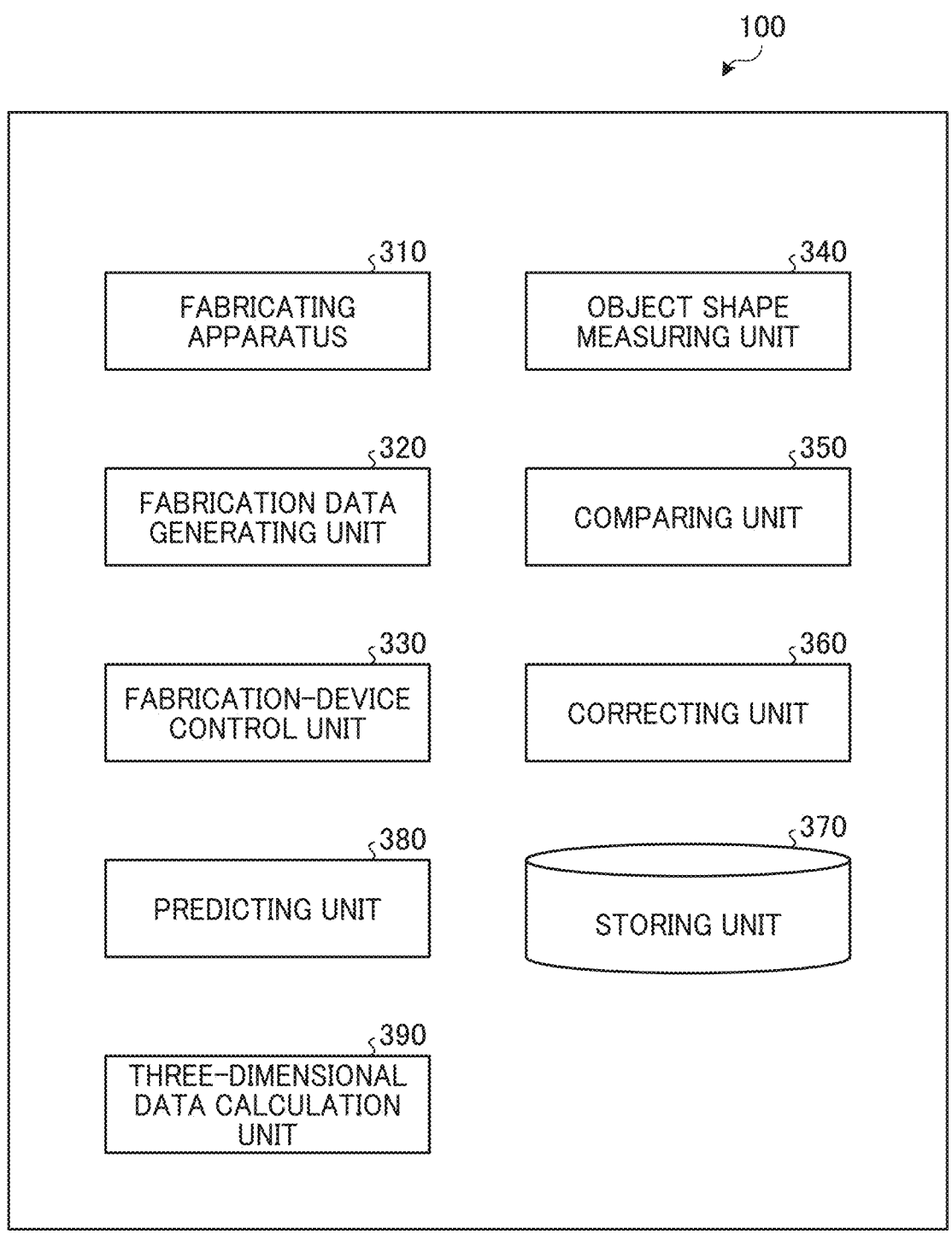

PLAN VIEW

PROBABLE IMAGE

CROSS SECTIONAL VIEW

PLAN VIEW

Z IS LOW

MEASURING DEVICE AND FABRICATING APPARATUS

CROSS-REFERENCE TO RELATED APPLICATION

This patent application is based on and claims priority pursuant to 35 U.S.C. § 119(a) to Japanese Patent Application No. 2018-123993, filed on Jun. 29, 2018, in the Japan Patent Office, the entire disclosure of which is hereby incorporated by reference herein.

BACKGROUND

Technical Field

Aspects of the present disclosure relate to a measuring device, a reading device, and a fabricating apparatus.

Related Art

A fabricating apparatus (so-called "3D printer") that fabricates a three-dimensional object based on input data has been developed. Various methods have been proposed to perform a three-dimensional fabrication, for example, a fused filament fabrication (FFF, a hot-melt filament manufacturing method), a selective laser sintering (SLS, a powder-sintering lamination fabrication method), a material jetting (MJ), an electron beam melting (EBM), and a stereolithography apparatus (SLA).

For example, a technology is known that sets the spatial resolution of a measurement point adaptively to each local region to shorten the measurement processing time in the scanning of the three-dimensional shape of a measurement object to be a target of three-dimensional fabrication by a fabricating apparatus.

SUMMARY

In an aspect of the present disclosure, there is provided a measuring device that includes processing circuitry. The processing circuitry is configured to project a pattern light beam onto a measurement object; acquire, as measurement data, a projection image of the measurement object onto which the pattern light beam is projected; predict, using fabrication data for fabricating the measurement object, a probable image formed by projection of the pattern light beam onto the measurement object to form prediction data; correct the measurement data with the prediction data to form corrected data; and calculate three-dimensional data to the measurement object, using the corrected data.

In another aspect of the present disclosure, there is provided a fabricating apparatus that includes a fabricating device and the measuring device. The fabricating device is configured to fabricate a three-dimensional object according to fabrication data. The measuring device is configured to measure the three-dimensional object as the measurement object. The processing circuitry controls the fabrication device based on the three-dimensional data measured by the measuring device.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 3 is a block diagram of a functional configuration of the fabricating apparatus;

Figure 1A:
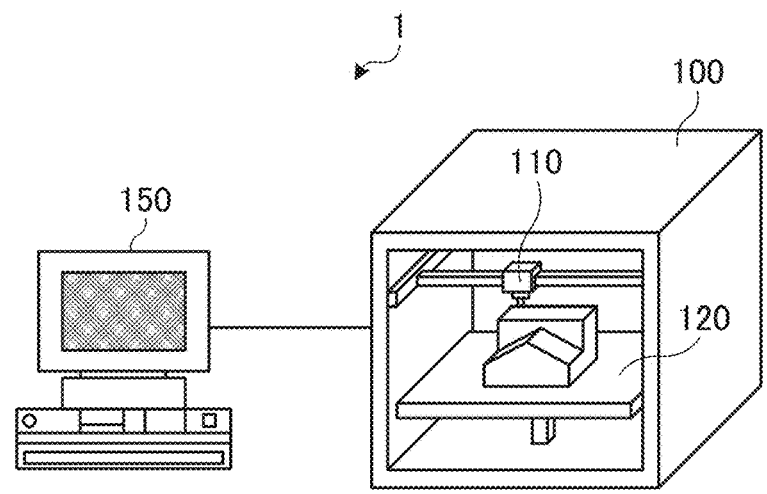
FIGS. 1A, 1B, and 1C are schematic views of a configuration of a three-dimensional fabricating system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, embodiments of a reading device and a fabricating apparatus are described with reference to accompanying drawings.

Figure 1B:
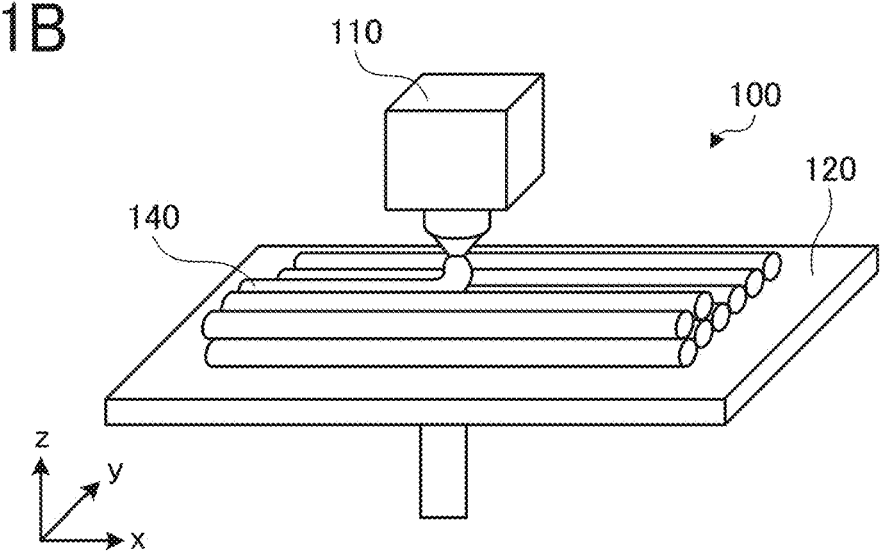
Figure 1C:
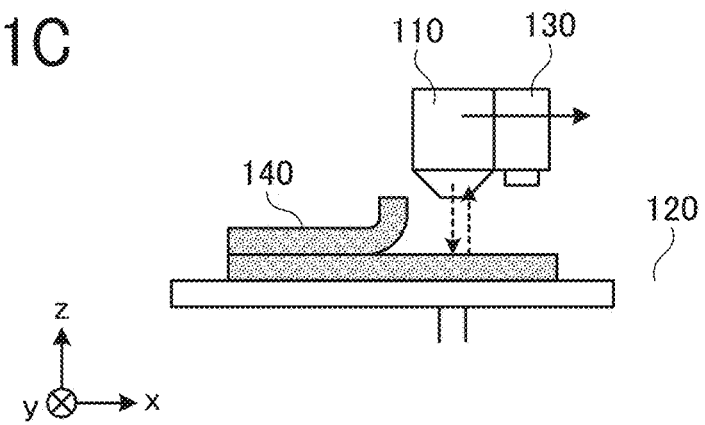

FIGS. 1A, 1B, and 1C are schematic views of a configuration of a three-dimensional fabricating system 1 according to an embodiment of the present disclosure. In the following description, the height direction of a three-dimensional object is referred to as z-axis direction, and a plane orthogonal to the z-axis direction is referred to as xy plane for convenience of explanation.

As illustrated in FIG. 1A, the three-dimensional fabricating system 1 includes a fabricating apparatus 100 to fabricate a three-dimensional object and an information processing terminal 150. The information processing terminal 150 transmits, to the fabricating apparatus 100, shape data of a three-dimensional object to be fabricated. The fabricating apparatus 100 receives the shape data of the three-dimensional object to be fabricated, which is transmitted from the information processing terminal 150. The fabricating apparatus 100 forms a three-dimensional object based on the shape data.

The information processing terminal 150 may operate as a controller that controls a process executed by the fabricating apparatus 100. The fabricating apparatus 100 may incorporate a function of the information processing terminal 150.

As illustrated in FIG. 1B, the fabricating apparatus 100 includes a head 110 and a stage 120. The head 110 is movable in parallel to the xy plane. The fabricating apparatus 100 discharges a fabrication material 140 from the head 110 onto the stage 120 and fabricates a layer shape on the xy plane. The fabricating apparatus 100 draws one-dimensional line drawing in the same plane to fabricate a fabrication layer corresponding to one layer of a three-dimensional object.

When the fabrication of a first fabrication layer is completed, the fabricating apparatus 100 lowers the stage 120 by the height (lamination pitch) of one layer in the direction along the z-axis. The fabricating apparatus 100 drives the head 110 in the same manner as for the first layer to form a second fabrication layer. The fabricating apparatus 100 repeats the above-described operations to laminate fabrication layers and fabricate the three-dimensional object.

In the above description, the fabricating apparatus 100 is described with an example of the configuration of moving the head 110 in the xy plane and moving the stage 120 in the z-axis direction. However, the configuration of the fabricating apparatus 100 is not limited to the above-described configuration in the present embodiment but may be any other suitable configuration.

As illustrated in FIG. 1C, the fabricating apparatus 100 further includes a shape sensor 130 to measure the shape of a fabrication layer during fabrication or the shape of a three-dimensional object after fabrication. The shape sensor 130 measures, for example, the dimensions in the x-axis, y-axis, and z-axis directions of a three-dimensional object.

Examples of the shape sensor 130 include an infrared sensor, a camera, and a three-dimensional measurement sensor (for example, a light-cutting profile sensor). That is, the fabricating apparatus 100 also functions as a reading device or a measuring device. In the present embodiment, a three-dimensional (3D) measurement sensor (for example, a light cutting profile sensor) is applied as the shape sensor 130. The shape sensor 130 (3D measurement sensor) includes a projection unit 130a (see FIG. 4) to project a pattern light beam on a measurement object and a camera 130b to acquire image data of a two-dimensional (2D) image (camera image) of the measurement object onto which the pattern light beam is projected.

As illustrated in FIG. 1C, for example, the shape sensor 130 may measure the shape of a fabrication layer in conjunction with the fabricating operation by the head 110. The shape sensor 130 may also measure the shape of one fabrication layer each time the fabrication layer is fabricated. Further, the timing and range of the measurement of the three-dimensional object with the shape sensor 130 may be arbitrarily selected and are not particularly limited to the above-described embodiment.

Next, a hardware configuration of the fabricating apparatus 100 is described below.

Figure 2:
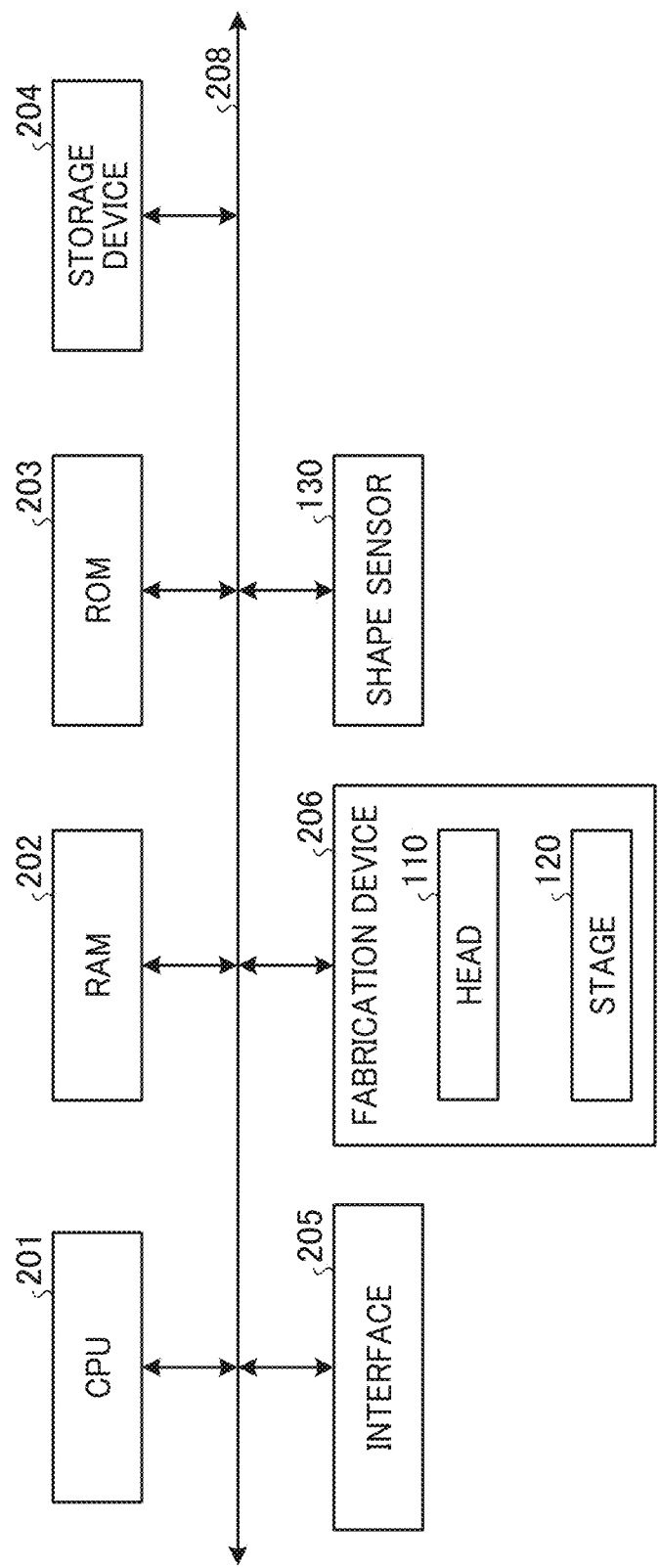
FIG. 2 is a schematic view of a hardware configuration of the fabricating apparatus.

FIG. 2 is a diagram of a hardware configuration of the fabricating apparatus 100. As illustrated in FIG. 2, the fabricating apparatus 100 includes a central processing unit (CPU) 201, a random access memory (RAM) 202, a read only memory (ROM) 203, a storage device 204, an interface 205, a fabrication device 206, and the shape sensor 130. Each piece of hardware is connected via a bus 208.

The CPU 201 is a device that executes a program that controls an operation of the fabricating apparatus 100 and performs predetermined processing. The RAM 202 is a volatile storage device to provide an execution space of a program executed by the CPU 201 and is used to store and expand programs and data. The ROM 203 is a nonvolatile storage device to store programs and firmware, etc., executed by the CPU 201.

The storage device 204 is a readable and writable non-volatile storage device that stores an operation system (OS), various applications, programs, setting information, various data, and the like that cause the fabricating apparatus 100 to function.

The program (including the OS and various applications) executed by the fabricating apparatus 100 according to the present embodiment is a file of an installable format or an executable format, and is recorded and provided in a computer readable recording medium, such as a compact disc-read only memory (CD-ROM), a flexible disk (FD), a compact disc-recordable (CD-R), a digital versatile disk (DVD).

The program (including the OS and various applications) executed by the fabricating apparatus 100 according to the present embodiment may also be stored on a computer connected to a network such as the Internet, and provided by being downloaded via the network. Further, the program (including the OS and various applications) executed by the fabricating apparatus 100 according to the present embodiment may be provided or distributed via a network such as the Internet.

Further, the program (including the OS and various applications) executed by the fabricating apparatus 100 according to the present embodiment may be provided by being incorporated in advance in a ROM or the like.

The interface 205 is a device to connect the fabricating apparatus 100 to another apparatus. The interface 205 can be connected to, for example, the information processing terminal 150, a network, an external storage device, or the like. The fabricating apparatus 100 can receive control data of a fabricating operation, shape data of a three-dimensional object, and the like via the interface 205.

The fabrication device 206 is a fabricator that fabricates a desired three-dimensional object from the fabrication material 140. The fabrication device 206 includes the head 110, the stage 120, and the like, and is configured in accordance with a fabrication method. For example, the fabrication device 206 in a fused filament fabrication (FFF) method includes a heating mechanism to melt the fabrication material 140, a nozzle to discharge the fabrication material 140, and so on. The fabrication device 206 in a selective laser sintering (SLS) method includes a laser light source and the like.

As described above, the shape sensor 130 is a device that measures the shape of the fabrication layer during fabrication or the three-dimensional object after fabrication.

Next, a description is given of functions performed by the CPU 201 of the fabricating apparatus 100 executing programs stored in the storage device 204 and the ROM 203.

FIG. 3 is a block diagram of a functional configuration of the fabricating apparatus 100 according to an embodiment of the present disclosure.

As illustrated in FIG. 3, the CPU 201 of the fabricating apparatus 100 includes a data input unit 310, a fabrication data generating unit 320, a fabrication-device control unit 330, an object shape measuring unit 340, a comparing unit 350, a correcting unit 360, a storing unit 370, a predicting unit 380, and a three-dimensional data calculation unit 390.

In the present embodiment, the CPU 201 executes programs to achieve the above-described functions of the fabricating apparatus 100. However, embodiments of the present disclosure are not limited to such a configuration. For example, a part or all the functions of the above-described units may be achieved by dedicated hardware circuits.

The data input unit 310 receives input such as shape data to form a three-dimensional object. The shape data is generated by, for example, the information processing terminal 150 and is input to the data input unit 310 via the interface 205.

The fabrication data generating unit 320 divides the shape data input to the data input unit 310 in the height direction of the three-dimensional object, to generate fabrication data of a plurality of fabrication layers. The three-dimensional object to be fabricated is divided into units of lamination pitch, and the fabrication data is generated as data indicating the shape of a fabrication layer to form each layer to be laminated. The fabrication data may be binary data indicating whether the fabrication process is executed or not in xy plane coordinates of each layer. In some embodiments, not only the presence or absence of fabrication at each coordinate but also the amount of fabrication at each coordinate, the discharge amount of the fabrication material, and the like may be included as parameters.

In FIG. 3, the fabrication data generating unit 320 is included in the fabricating apparatus 100. In some embodiments, the fabrication data generating unit 320 may be included in the information processing terminal 150. In such case, the fabrication data generated by the information processing terminal 150 is transmitted to the fabricating apparatus 100 to execute the fabrication process.

The object shape measuring unit 340 controls the shape sensor 130 and measures measurement data such as height data as the shape of a measurement target layer that is a fabrication layer being fabricated or a three-dimensional object having been fabricated. The object shape measuring unit 340 functions as a measurement data acquisition unit and acquires measurement results as measurement data.

For example, the object shape measuring unit 340 acquires data for measuring the shape of the fabrication object. For example, when measuring the height data by the light cutting method, the object shape measuring unit 340 emits a line-shaped laser beam (pattern light beam) to a measurement target layer, to acquire an image of reflected light with the camera 130*b* of the shape sensor 130. The object shape measuring unit 340 sends the acquired image data to the three-dimensional data calculation unit 390.

The fabrication-device control unit 330 controls an operation of fabricating a three-dimensional object with the fabrication device 206 according to the fabrication data. The fabrication-device control unit 330 adjusts the position of the head 110 and the height of the stage 120 according to the fabrication data so that the fabrication-device control unit 330 can fabricate the three-dimensional object while controlling various parameters, such as the fabrication speed and the lamination pitch, and algorithms. The fabrication-device control unit 330 can also control the fabrication amount according to the fabrication data. For example, the discharge amount of the fabrication material 140 can be controlled in the FFF method, and the laser intensity can be controlled in the SLS method.

Using the shape data of the measurement object (shape data for fabricating the three-dimensional object), the predicting unit 380 predicts a probable image to be obtained when the pattern light beam is projected onto the measurement object. The predicting unit 380 converts the certainty (probability) into gradations and combines the gradations into a probable image, and sends the probable image to the three-dimensional data calculation unit 390 as prediction data.

Here, the predicting unit 380 is further described. The predicting unit 380 executes simulations of, for example, height variation of the measurement object, using the fabrication data for fabricating the measurement object (the formation layer in fabrication or the three-dimensional object after fabrication.

FIGS. 4A to 4D are diagrams of an example of a method of generating prediction data in the predicting unit 380. In an example illustrated in FIG. 4, a pattern light beam is emitted from the projection unit 130*a* of the shape sensor 130 (e.g., the 3D measurement sensor) to a measurement object (a fabrication layer during fabrication or a three-dimensional object after fabrication) having a step, to acquire a 2D image (camera image) with the camera 130*b*.

Figure 4A:
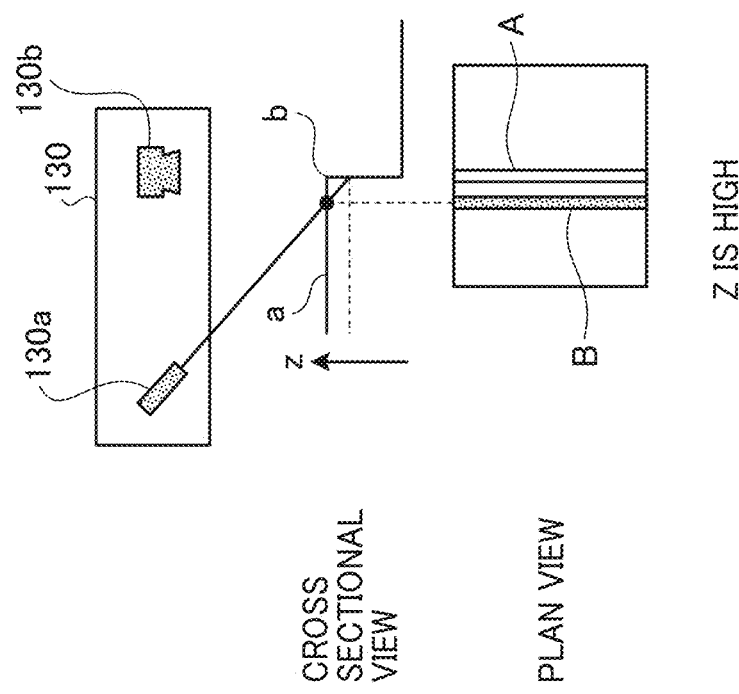
FIGS. 4A, 4B, 4C, and 4D are diagrams of an example of a method of generating prediction data in a predicting unit.

FIG. 4A illustrates a case in which the height Z of a measurement object in the z-axis direction is ideal. Emission line A in FIG. 4A represents an image obtained by imaging the ideal case in which the pattern light beam is emitted to a step b of the measurement object a with the camera 130*b*. That is, in the ideal case illustrated in FIG. 4A, a camera image can be obtained in which the emission line A is positioned on the step b of the measurement object a.

Figure 4B:
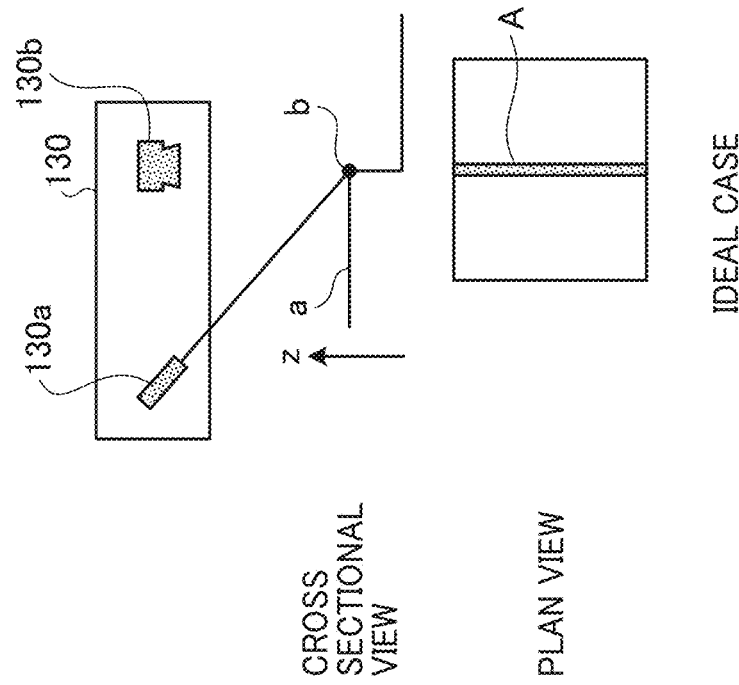

On the other hand, when the height Z of the measurement object a in the z-axis direction is higher than the height Z in the ideal case, as illustrated in FIG. 4B, the pattern light beam is emitted to a position closer to the projection unit 130*a* than the step b of the measurement object a. In such a case, an emission line B is shifted to a position closer to the projection unit 130*a* than the emission line A as compared with in the ideal case illustrated in FIG. 4A.

Figure 4D:
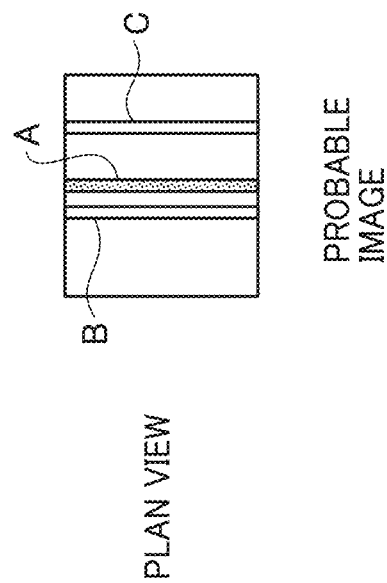
Figure 4C:
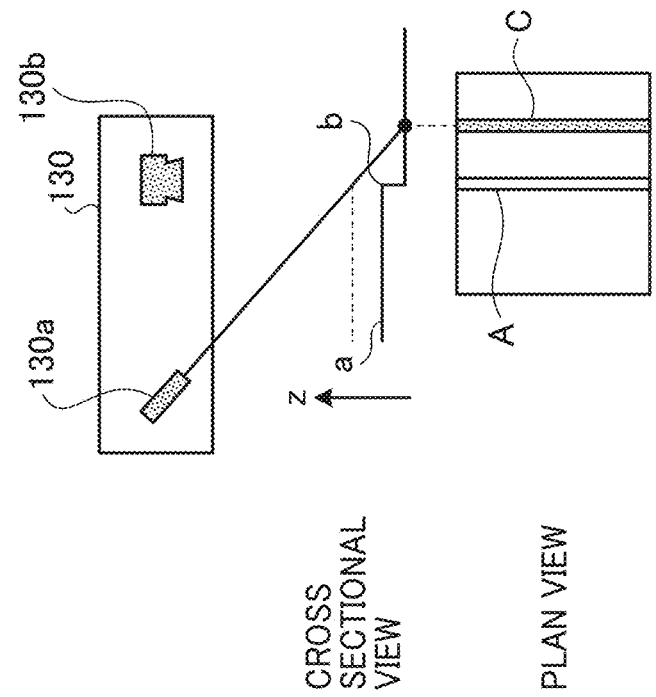

On the other hand, when the height Z of the measurement object a in the z-axis direction is lower than the height Z in the ideal case, as illustrated in FIG. 4C, the pattern light beam is emitted to a position farther from the projection unit 130*a* than the step b of the measurement object a. In such a case, an emission line C is shifted to a position farther from the projection unit 130*a* than the emission line A as compared with the ideal case illustrated in FIG. 4A.

The predicting unit 380 executes simulation on the variation of the height Z as illustrated in FIGS. 4A to 4C, using fabrication data for fabricating the measurement object, to obtain a probable image. In the probable image illustrated in FIG. 4D, the emission line A, the emission line B, and the emission line C are weighted and displayed. That is, the emission line A in the ideal case is weighted more than each of the emission line B and the emission line C. Such a probable image illustrated in FIG. 4D is used as prediction data. That is, the predicting unit 380 converts the certainty into gradations and combines the gradations into a probable image as the prediction data.

The three-dimensional data calculation unit 390 corrects the measurement data using the prediction data to obtain probable corrected measurement data. The three-dimensional data calculation unit 390 functions as a calculator and calculates three-dimensional data (actual height data) of the measurement object using the corrected measurement data.

Next, the three-dimensional data calculation unit 390 is further described.

Figure 5:
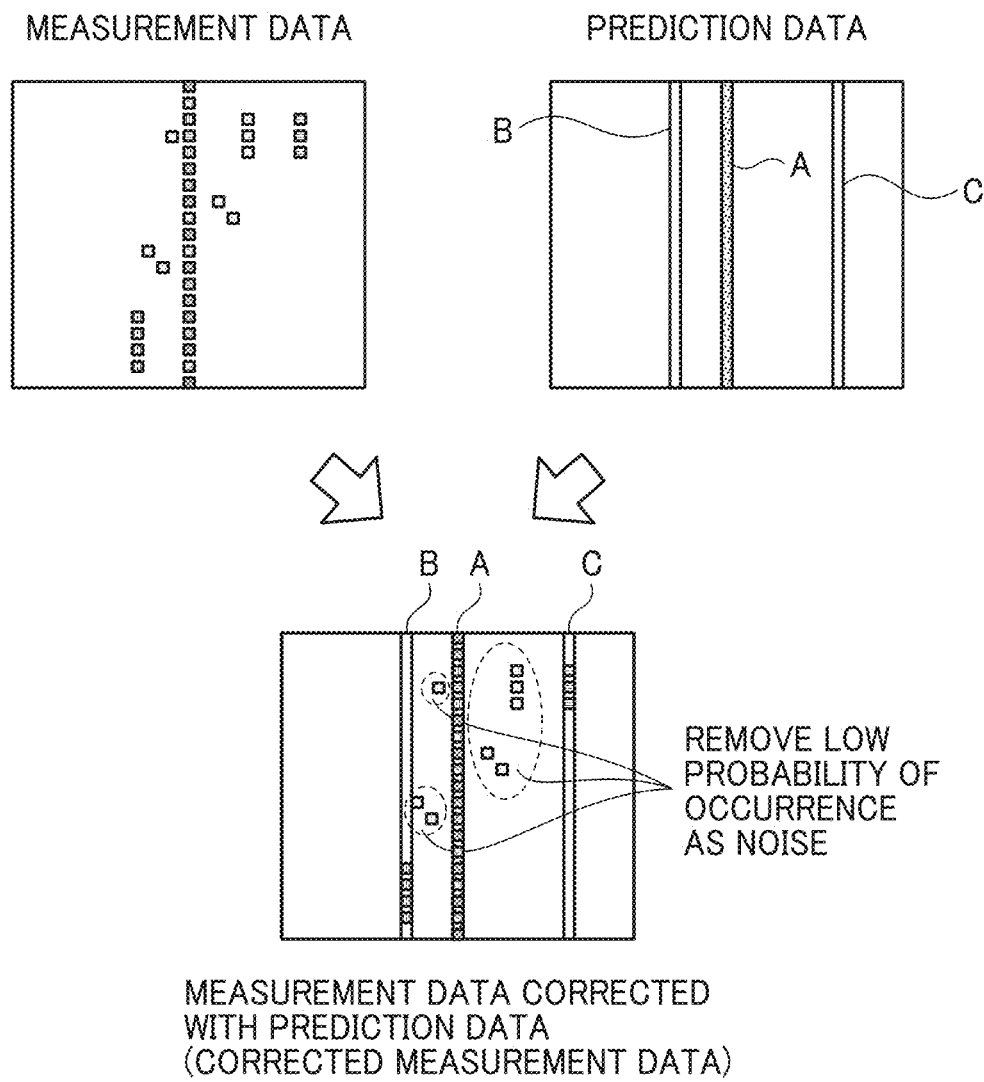
FIG. 5 is an illustration of a method of calculating three-dimensional data in a three-dimensional data calculation unit.

FIG. 5 is an illustration of a calculation method of three-dimensional data in the three-dimensional data calculation unit 390. As illustrated in FIG. 5, the three-dimensional data calculation unit 390 corrects the measurement data using the prediction data to obtain probable corrected measurement data. The three-dimensional data calculation unit 390 calculates three-dimensional data (actual height data) of the measurement object using the corrected measurement data.

For example, the three-dimensional data calculation unit 390 uses prediction data for mask processing. The detection value of the measurement data coincident with the emission line A, the emission line B, or the emission line C of the prediction data has a higher occurrence probability as the weighting is larger. The measurement data contains many noise components. Therefore, the three-dimensional data calculation unit 390 masks the measurement data to remove a detected value with a low occurrence probability as noise and obtain corrected measurement data.

The comparing unit 350 compares the fabrication data with the height data (three-dimensional data) calculated by the three-dimensional data calculation unit 390 and calculates an error caused by the fabrication, from a difference between the fabrication data and the height data. The shape of the three-dimensional object may vary with the type of the fabrication material 140 and various conditions such as the ambient temperature. The height data (three-dimensional data) used here refers to data obtained by measuring a plurality of fabrication layers fabricated in the first to nth layers and removing noise. In addition, after the fabrication material 140 is cooled or hardened, shrinkage or warpage may occur as compared with immediately after forming. If the lamination is continued with shrinkage and the like, a three-dimensional object different from the desired three-dimensional object may be fabricated. Therefore, the error between the fabrication data and the height data (three-dimensional data) calculated by the three-dimensional data calculating unit 390, which indicates the shape of the fabrication layer actually fabricated, is fed back to the fabrication data of the subsequent layer and is used for correction.

The correcting unit 360 corrects fabrication data for fabricating a three-dimensional object. For example, the correcting unit 360 can correct the fabrication data so that the fabricating operation performed by the fabrication-device control unit 330 is changed according to the difference compared by the comparing unit 350. Here, changing the fabricating operation indicates changing of parameters and algorithms included in the fabrication data. Examples of the parameters and algorithms include the shape of the three-dimensional object to be fabricated, the dimension and height of each fabrication layer, the fabrication amount based on the fabrication data, the melting temperature of the fabrication material, the fabrication speed, and the lamination pitch. When the fabrication data is corrected, the fabrication-device control unit 330 executes the fabrication process based on the corrected fabrication data.

The storing unit 370 stores various data, such as shape data, fabrication data, measurement data, and height data (three-dimensional data) calculated by the three-dimensional data calculation unit 390, in the storage device 204. Various data are written into and read from the storing unit 370 by the functional units.

Figure 6:
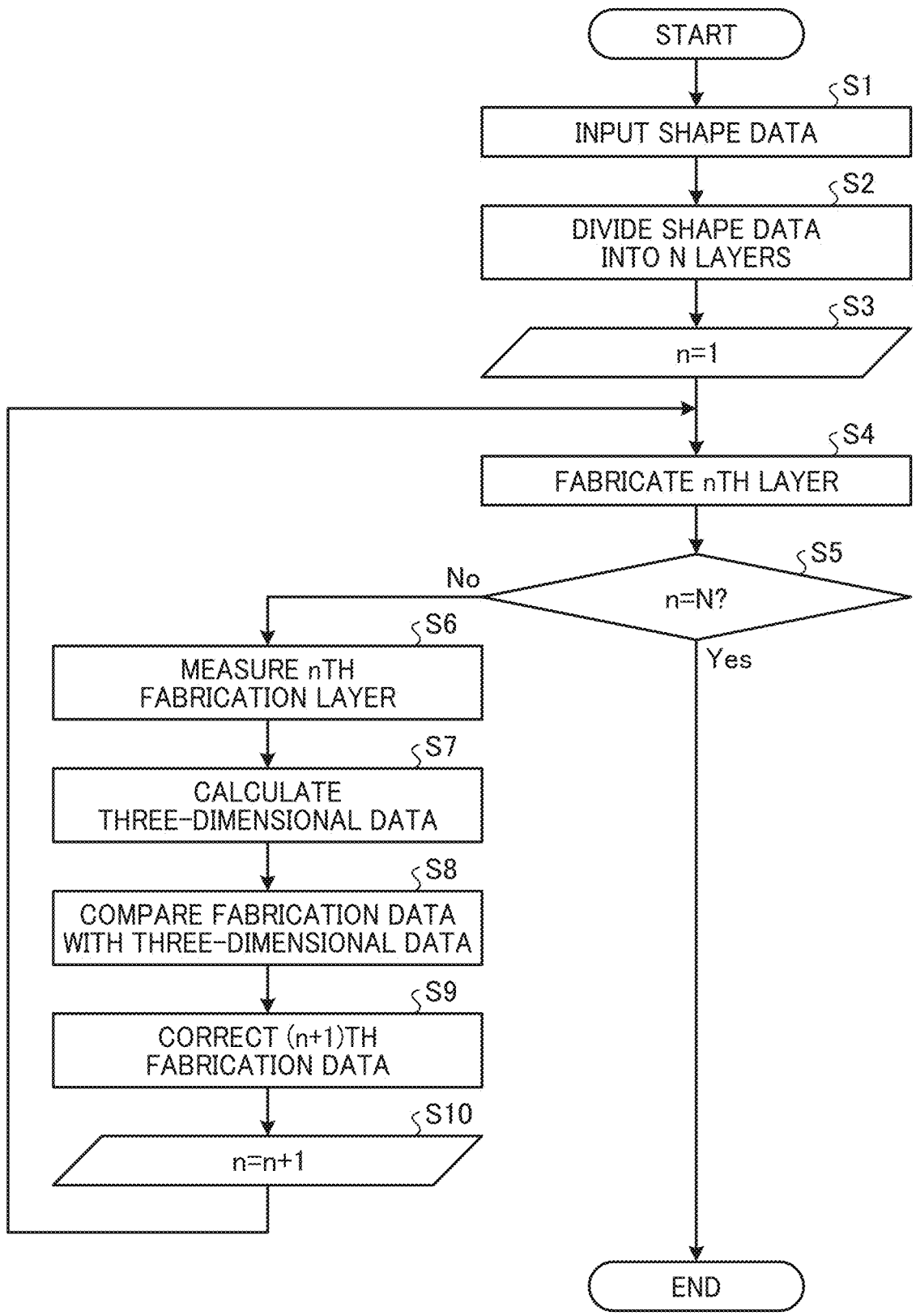
FIG. 6 is a flowchart of a flow of processing in which the fabricating apparatus fabricates a three-dimensional object.

FIG. 6 is a flowchart of a flow of processing in which the fabricating apparatus 100 fabricates a three-dimensional object.

First, in step S1, the data input unit 310 receives an input of shape data. In step S2, the fabrication data generating unit 320 generates fabrication data in which the input shape data is divided into N layers in the height direction of the three-dimensional object. The generated fabrication data may be stored in the storing unit 370.

In step S3, the fabrication-device control unit 330 sets n=1. In step S4, the fabrication-device control unit 330 controls the operation of the fabrication device 206 according to the fabrication data of the nth layer to fabricate the fabrication layer of the nth layer. In step S5, the fabrication-device control unit 330 branches the process depending on whether n=N. That is, when n and N match (Yes in step S5), the fabrication-device control unit 330 fabricates all fabrication layers and terminates the fabrication process assuming that the three-dimensional object is completed. When n and N do not match (No in step S5), the fabrication-device control unit 330 branches to step S6 to fabricate the next layer because there is a fabrication layer to be fabricated.

In step S6, the object shape measuring unit 340 measures the shape of the nth fabrication layer fabricated.

Subsequently, in step S7, the three-dimensional data calculation unit 390 calculates three-dimensional data (actual height data) of the measurement object using the corrected measurement data obtained by correcting the measurement data using the prediction data.

In step S8, the comparing unit 350 compares the fabrication data of the nth layer with the three-dimensional data (actual height data) of the nth layer to calculate a difference.

Next, in step S9, the correcting unit 360 corrects the fabrication data for fabricating the (n+1)th layer according to the difference of the nth layer. The correction process may be performed for each layer or may be performed based on the difference between a plurality of layers. The difference between the layers may be stored in the storing unit 370 when needed, and the correcting unit 360 may read the difference between the layers stored in the storing unit 370 and correct the fabrication data of the (n+1)th layer according to the difference from the first layer to the nth layer.

In step S10, the fabrication-device control unit 330 counts up the value of n to n+1 and returns to the processing of step S4. Here, in the processing of step S4 executed at the second time and after, fabrication is performed based on the corrected fabrication data. The fabricating apparatus 100 repeats the process of steps S4 to S10 until the fabrication based on the fabrication data of the nth layer is completed.

The fabricating operation can be changed by feeding back the difference based on the fabricated fabrication layer to the next fabrication layer by the process of the flowchart described above, thus allowing fabrication of a desired three-dimensional object.

As described above, according to the present embodiment, an image observed by the camera 130b is predicted using shape data of a measurement object (shape data for fabricating a three-dimensional object), and a camera image is corrected using the prediction data, and three-dimensional data (actual height data) of the measurement object is calculated using the corrected measurement data. Accordingly, in the case in which a prediction value of three-dimensional data of a measurement object can be calculated, the three-dimensional data (actual height data) of the measurement object can be inexpensively and easily obtained. In particular, a fabricating apparatus that fabricates a three-dimensional object can inexpensively and easily achieve high precision of three-dimensional data of an intermediate fabrication object.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A controller configured to control a fabricating device to fabricate a three-dimensional object based on fabrication data, the controller comprising:
processing circuitry configured to:
measure a shape of a current layer of the three-dimensional object by (i) instructing a shape sensor to project a pattern light beam onto the current layer of the three-dimensional object and (ii) acquiring, as measurement data, a projection image from the shape sensor of the current layer of the three-dimensional object onto which the pattern light beam is projected;
calculate at least a height of the three-dimensional object by,
correcting the measurement data by (i) predicting, using the fabrication data, a probable image formed by projection of the pattern light beam onto the current layer of the three-dimensional object to form prediction data, and (ii) correcting the measurement data based on the prediction data to form corrected measurement data, and
calculating at least the height of the three-dimensional object based on the corrected measurement data;
correct the fabrication data associated with fabricating a next layer of the three-dimensional object based on a least the height of the three-dimensional object to generate corrected fabrication data; and
control the fabricating device to generate the next layer of the three-dimensional object based on the corrected fabrication data.

2. The controller according to claim 1, wherein the processing circuitry is configured to predict the probable image by converting certainty of the probable image into gradations and combining the gradations into the probable image.

3. The controller according to claim 1, wherein the shape sensor is configured to project the pattern light beam of a line shape onto the three-dimensional object by emitting a line-shaped laser beam thereto.

4. A fabricating apparatus comprising:
the controller of claim 1;
the shape sensor configured to project the pattern light beam onto the current layer of the three-dimensional object; and
the fabricating device configured to fabricate the three-dimensional object based on the fabrication data by fabricating the next layer of the three-dimensional object based on the corrected fabrication data.

5. The fabricating apparatus according to claim 4, wherein the three-dimensional object includes a plurality of fabrication layers in a height direction of the three-dimensional object, the plurality of fabrication layers including the current layer and the next layer, and
the processing circuitry corrects the fabrication data to change the fabrication data associated with the next layer.

6. The controller of claim 1, wherein the processing circuitry is configured to correct the measurement data by masking the measurement data to remove noise therefrom.

7. The controller of claim 6, wherein the processing circuitry removes noise from the measurement data by deleting certain values from the measurement data measured by the shape sensor having a low occurrence probability based on the prediction data.

* * * * *